Figure 3:
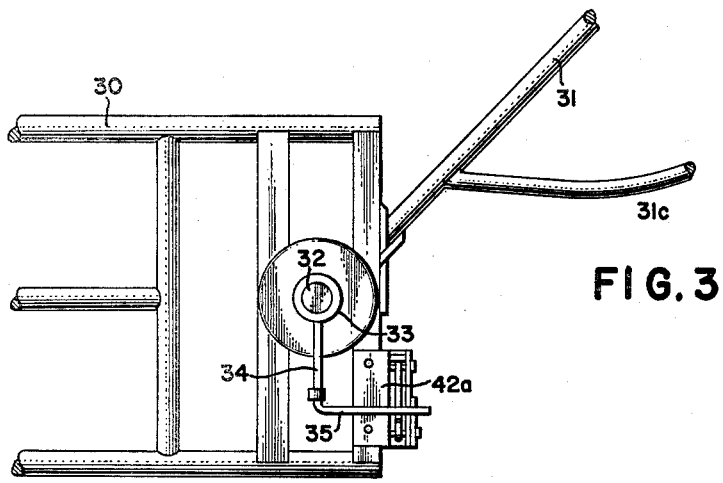

Nov. 5, 1963
D. A. HARRIS
3,109,592
SPRAY ATTACHMENT
Filed June 14, 1962
3 Sheets-Sheet 1
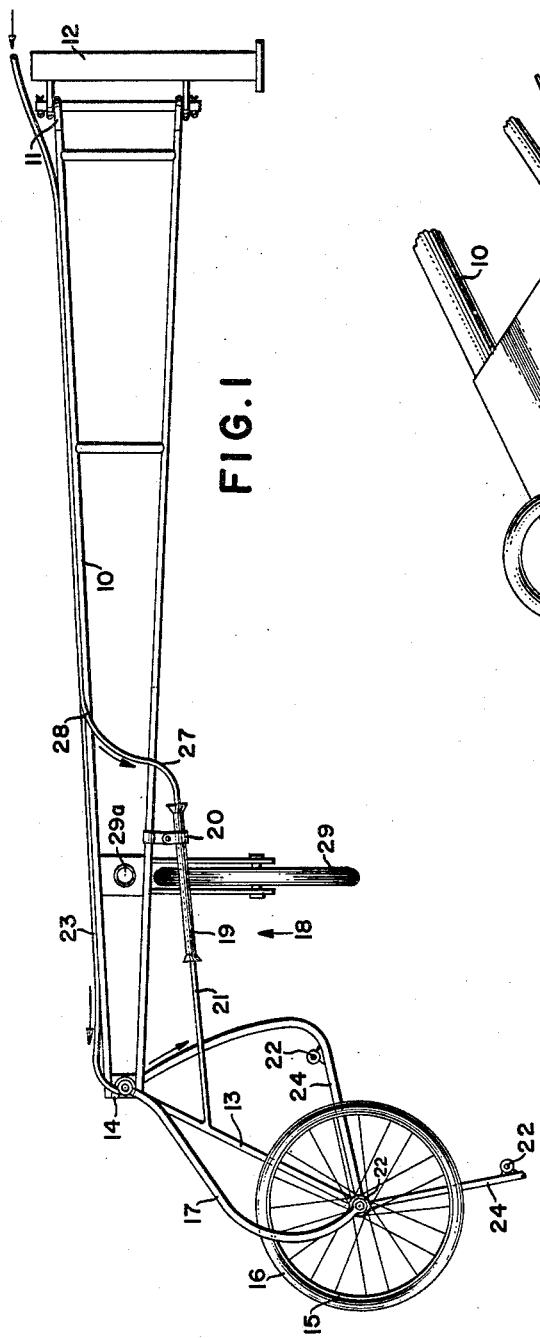
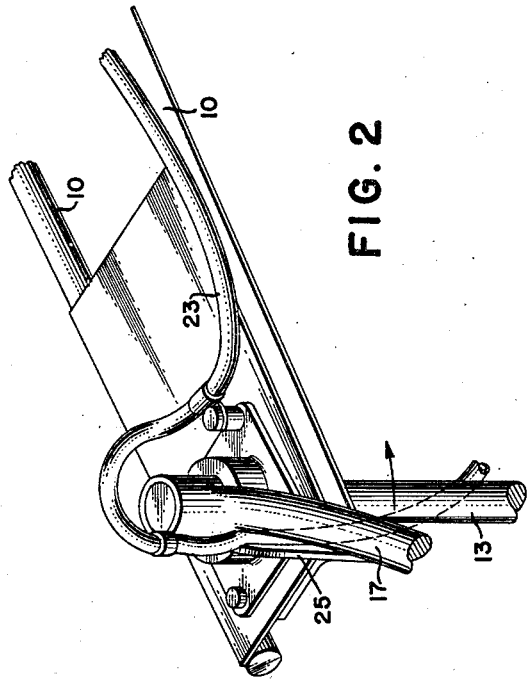
INVENTOR
DAVID ALAN HARRIS
BY *Cushman, Darby & Cushman*
ATTORNEYS Nov. 5, 1963 — D. A. HARRIS — 3,109,592
SPRAY ATTACHMENT
Filed June 14, 1962 — 3 Sheets-Sheet 2

INVENTOR
DAVID ALAN HARRIS
BY Cushman, Darby & Cushman
ATTORNEYS

Nov. 5, 1963 D. A. HARRIS 3,109,592
SPRAY ATTACHMENT
Filed June 14, 1962 3 Sheets-Sheet 3
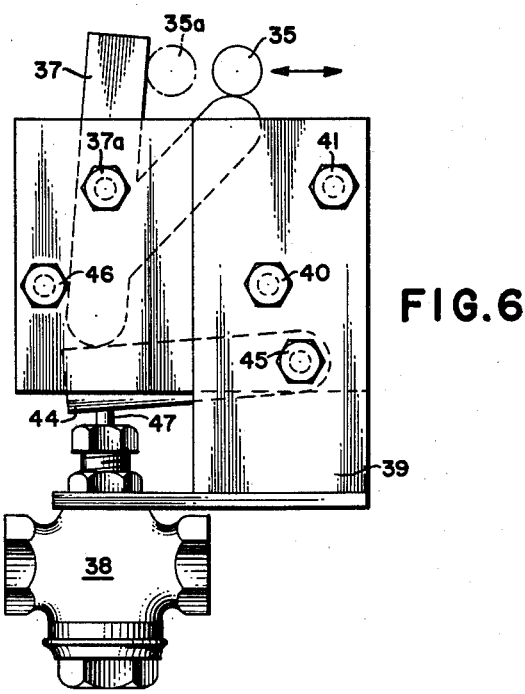
FIG.6
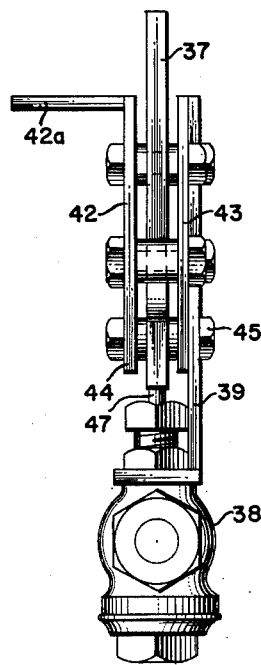
FIG.7
FIG.8
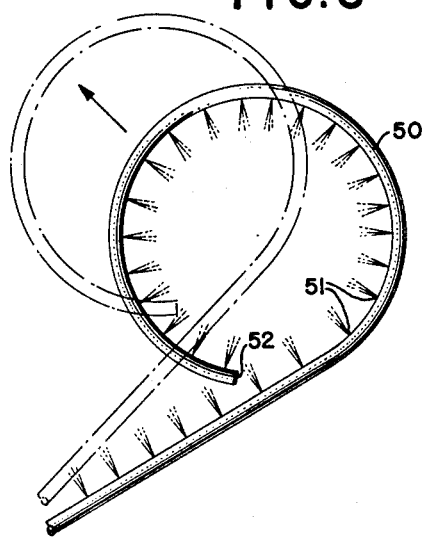
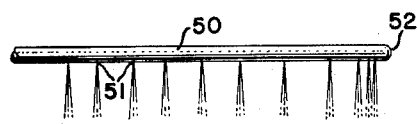
FIG.9
INVENTOR
DAVID ALAN HARRIS
BY Cushman, Darby & Cushman
ATTORNEYS United States Patent Office 3,109,592
Patented Nov. 5, 1963

3,109,592
SPRAY ATTACHMENT
David Alan Harris, Fernhurst, England, assignor to Imperial Chemical Industries Limited, London, England, a corporation of Great Britain
Filed June 14, 1962, Ser. No. 202,429
Claims priority, application Great Britain June 23, 1961
6 Claims. (Cl. 239—165)

This invention relates to spray attachments and particularly to a spray attachment for use in the application of weedkiller to the ground at the foot of orchard or plantation trees.

The invention provides a spray attachment comprising an arm pivotally mounted on a support said arm carrying discharge means for liquid weedkiller, and means for biasing the arm into an extended position with respect to the support, whereby when the support is moved so that the extended arm strikes a tree, the arm is deflected from its extended position but is kept in contact with the periphery of the tree by the biasing means thereby guiding the discharge means over the ground at the foot of the tree.

In one of the preferred embodiments of the invention the arm and the discharge means for the weedkiller are both constituted by a tube having a series of discharge orifices. Alternatively, the discharge means can be carried by the arm as a separate member, for instance one or more spray nozzles fed by pipe which can be supplied from a suitable source of liquid weedkiller.

In one preferred form the arm has a roller pivotally mounted on the arm for rotation, which provides the means for the deflection of the arm from its extended position when the rim of the wheel strikes a tree by movement of the support (which can be for instance a boom carried by a tractor) past a tree which it is wished to spray. This roller wheel is conveniently a bicycle wheel mounted horizontally with respect to the ground. Where the spray attachment is to be used with top fruit trees the roller should preferably have a resilient rim to avoid accidental damage to the bark of the tree which might otherwise occur. For this reason it has been found convenient to use as the roller wheel a bicycle wheel fitted with a pneumatic tire. The extended position of the arm is preferably one in which it trails behind the axis of the boom, for example by 30° or more. When the arm is deflected into a deflected position the angle of trail of course is increased. Where the support is a boom carried by a tractor, the boom can be maintained at a substantially constant height above the ground by means of a skid or caster wheel.

Since one of the principal purposes of the spray attachment of the invention is the spraying of the ground at the foot of fruit trees, it can be convenient to have means for interrupting the spraying when the spray attachment is being moved between one tree and the next. For example, the spray attachment can have a valve operatively connected with the arm. A most satisfactory way of achieving this is to arrange that the valve opens when the arm is first deflected from its extended position and closes when the arm returns to the extended position, that is the valve prevents flow of weedkiller from the discharge means whenever the arm is in its extended position.

Figure 4:
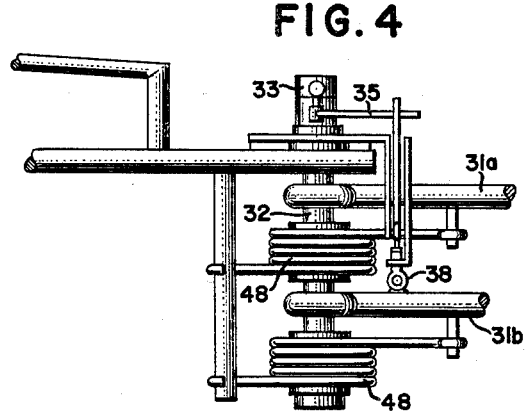
Figure 5:
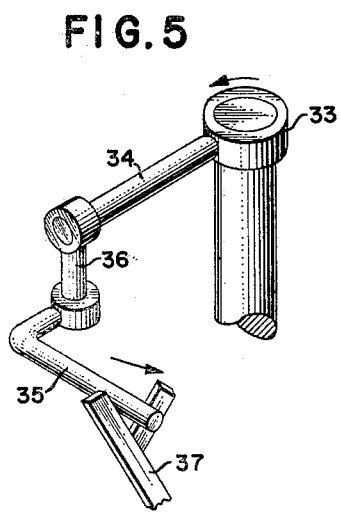

Spray attachments which constitute preferred embodiments of the invention are shown by way of example in the accompanying drawings. In the drawings FIGURES 1 and 2 illustrate a first embodiment, FIGURE 1 showing a side elevation and FIGURE 2 an enlargement of a detail of FIGURE 1. FIGURES 3–7 illustrate a second embodiment of the invention similar to that of FIGURES 1 and 2, but having alternative forms of valve mechanism and biasing means for the arm. FIGURES 3 and 4 are respectively enlarged plan and front elevation views; FIGURE 5 a perspective of the valve actuating mechanism and FIGURES 6 and 7 respectively front and side elevations of the valve assembly. FIGURES 8 and 9 show respectively plan and front elevation of an alternative spray arm which can be used in place of the spray arm shown in FIGURE 1.

Referring first to FIGURES 1 and 2, a spray boom 10 of lightweight steel tubing has an eye 11 at one end by which it can be pivotally mounted on a bracket 12 carried by a tractor (not shown) and at the other end it has an arm 13 which is pivotally mounted on the boom by a sealed ball-bearing 14 so that the arm can swing in a plane parallel to that containing the boom. The arm is of lightweight steel tubing of a gauge similar to that from which the boom is constructed. When the arm is in the position in which it trails behind the axis of the boom by about 60°, as shown in FIGURE 1, it extends about 1½ feet beyond the end of the boom and this position is referred to below as its "extended position."

The arm carries, at the end distant from its bearing 14, a roller wheel 15 which is rotatably-mounted on the arm by means of a ball-bearing. The wheel is a 20 inch diameter bicycle wheel having a pneumatic tire 16 softly inflated to provide a suitable means of absorbing the shock of impact upon the wheel when in use. The arm also carries a metal safety guard 17 having a D-shape as shown, to safeguard the arm from damage and to prevent a tree trunk becoming accidentally wedged between the arm and wheel if the tractor should be steered a little too close to a tree during spraying.

The pivotal movement of the arm on the end of the boom is controlled by means of a hydraulic buffer 18 which constitutes a biasing means for the arm. This buffer consists of a cylinder 19 pivotally attached to the boom by means of a bracket 20, and a piston 21 pivotally attached to the arm. The arrangement is such that when the piston is in its fully-retracted position with respect to the cylinder the arm is held at its extended position. When the piston is within the cylinder to the greatest extent possible the arm is in its fully retracted position.

The arm carries three spray nozzles 22, one of which is situated just below the axle of the roller wheel and the other two are held in the positions shown, by conventional means. The supply of spray liquid to the nozzles is provided for by means of flexible supply pipe 23 extending along the boom from a supply point (not shown) to the nozzles which are connected in series to the supply pipe by means of short lengths of copper tubing 24. The supply pipe is of polythene except for a short section where soft rubber is used. This rubber section passes between jaws (see FIGURE 2) constituted respectively by a flange 25 on the boom and the safety guard 17 in such a manner that when the arm is in its extended position the rubber section is tightly pinched between the jaws and thereby acts as a "pinch-point" valve to prevent flow of spray liquid towards the nozzles. The three spray nozzles are atomizer cone nozzles each arranged with respect to the arm so that when in use the spray is discharged downwardly at right-angles to the arm. Each of the nozzles incorporates a spring-loaded diaphragm valve to prevent spray liquid from leaking from the nozzles when the latter are not in operation and to ensure quick starting and stopping of the spray in accordance with the actuation of the pinch-point valve.

The hydraulic buffer cylinder 19 is fed by means of a second length of polythene tubing 27 which joins the supply pipe at a junction 28 on the supply side of the pinch-point valve. This arrangement, which utilizes the spray liquid as the hydraulic liquid for the buffer, allows spray liquid pressure to be exerted on the buffer irrespective of whether the pinch-point valve is open or shut.

To maintain the boom at the substantially uniform height of 2 feet above the ground, a caster wheel 29 is carried in the bearing 29a. The caster wheel has a 14 inch trail to ensure stability at low speeds. The caster wheel, like the roller wheel, is a 20 inch diameter bicycle wheel fitted with a pneumatic tire.

There now follows a description of the operation of the spray attachment above when used for the spraying of the ground immediately surrounding the base of a row of fruit trees. The attachment, for this purpose, is pivotally mounted on a tractor so that the boom extends from the tractor in a direction transverse to the direction of motion of the tractor. The tractor is one equipped with a spray liquid storage tank and delivery pump which is connected to the supply end of the boom supply pipe.

Before the tractor is put into motion the supply pump is started thereby feeding spray liquid from the storage tank to the hydraulic buffer. The hydraulic buffer cylinder fills with spray liquid forcing its piston outwards and thus causing the arm to move into its extended position in which the roller wheel is held well clear of the end of the boom. At this stage, however, spray liquid is not fed to the spray nozzles as the pinch-point valve is in the closed position. Moreover, spray liquid in the supply pipe between the pinch-point valve and the spray nozzles is prevented from leaking from the latter by reason of the spring-loaded diaphragm valves in the nozzles.

The tractor is then driven forward at about 2 or 3 miles per hour along a line parallel with the row of trees about which it is wished to spray and steered so that the roller wheel strikes the trunk of the first of the trees. Upon striking this tree the roller wheel and its associated arm are set back relatively to the spray boom, the arm moving about its pivot in the boom. Simultaneously with the start of the set-back the jaws between the arm and boom open, thereby allowing the pinch-point valve to open and permitting spray liquid to be pumped to the spray nozzles where the spring-loaded valves open under the pressure of the spray liquid which sprays through the nozzles on to the ground at the foot of the tree. As the tractor moves slowly forward the roller wheel rolls round the periphery of the tree trunk conforming with any irregularities it meets, but being constantly pressed against the trunk by pressure exerted by the hydraulic buffer. Once the point on the tree trunk nearest to the end of the boom has been reached, the wheel, as it rolls over the trunk, begins to return with its arm towards its extended position though it is maintained meanwhile in close contact with the trunk by the continuous action of the hydraulic buffer.

As soon as the roller wheel and arm have returned to the extended position the jaws between the arm and boom close, thereby closing the pinch-point valve and preventing further flow of the spray liquid to the spray nozzles and their valves immediately close and emission of spray liquid ceases. Thus, the spray liquid only issues from the spray nozzles during the period when the arm is being deflected from its extended position, which period is normally approximately the same as the period during which the roller wheel is in contact with the tree trunk. Therefore, it will be seen that with the specific embodiment being described spray liquid is applied only to the ground about the base of the tree and is not wasted by being applied to the ground between adjacent trees.

Once the roller wheel has ceased to contact the first tree trunk the tractor is steered so that the roller wheel strikes the next tree in the row and the sequence of operations described above is then repeated in respect of each successive tree until the tractor reaches the end of the row. The spraying of the ground about the trees is then completed by the tractor being driven along the other side of the row and steered so that the roller wheel strikes each of the trees in turn thereby causing spray liquid to be applied to the ground on that side of the trees and completing the spraying of the areas about the foot of each tree.

If during the spraying the tractor should be steered a little too close to a tree, the roller wheel will project beyond the tree and will not strike it, but the tree trunk will be struck by the safety guard which with its associated arm and roller wheel will be deflected so that the arm moves away from its extended position; the guard will slide along the trunk until the latter strikes the roller wheel which will then roll round the periphery of the trunk in the way described above.

The second embodiment, illustrated in FIGURES 3–7, is a spray attachment of the same general construction as the embodiment shown in FIGURES 1 and 2, but differing with regard to the valve assembly for control of the spray liquid and in the biasing means for the arm.

In FIGURES 3 and 4, the end of the spray boom 30 carries a forked arm 31 consisting of upper and lower forks 31a and 31b which carries a guard 31c and a roller wheel (not shown) and is pivotally mounted on the boom by means of pin 32 to which it is fixed. The forked arm 31 is biased towards its extended position by means of the two torsion springs 48 which surround the pivot pin 32. The upper end of the pin 32 is fixed to a collar 33 which is attached to the valve actuating mechanism shown in more detail in FIGURE 5.

Referring now to FIGURE 5, the collar 33 is fixed to an actuating rod 34 which in turn is fixed to a second actuating rod 35 through an adjustable link 36. One end of the rod 35 co-operates with a Y-shaped member 37 through which the valve can be actuated. This Y-piece and the remainder of the valve assembly are shown in detail in FIGURES 6 and 7.

In FIGURES 6 and 7, a plunger operated valve 38 carries an L-shaped plate 39 to which is bolted at 40 and 41 two spaced plates 42 and 43 between which there is pivotally mounted at 37a the Y-piece 37. Plate 42 has a flanged portion 42a by means of which the valve assembly is attached to the end of the boom 30 (FIGURE 3). The bottom edge of the Y-piece abuts the wedge 44 which is pivotally mounted (at 45) between the plates 42 and 43 and rests on the top of a spring-loaded plunger 47 of the valve 38. A nut and bolt assembly 46, connecting plates 42 and 43, acts as a stop for pivotal movement of the Y-piece.

There follows now a description of the actuation of the valve assembly when the spray attachment is in use.

When the forked arm is set back from its extended position upon the roller wheel striking a tree or similar obstacle, the arm moves against the force exerted by the torsion springs 48 thereby rotating the pivot pin 32 and the set collar 33 in an anti-clockwise direction as viewed in FIGURE 3. Rotation of the collar causes the actuating rod 35 to move in the direction shown in FIGURE 5, and the end of that arm pushes against the right-hand branch of the Y-piece causing the latter to pivot about its support 37a and push the wedge piece 44 down on the plunger 47 thereby opening the valve 38 and allowing spray liquid to flow towards the spray nozzles (not shown). The Y-piece is now in the "over-centre" position shown in FIGURE 6, in which it cannot be displaced merely by the action of the spring-loaded plunger, but only by the movement of the valve actuating rods in the direction reverse to that described above, which occurs when the forked arm returns to its extended position under the biasing influence of the torsion springs 48.

In the alternative form of spray arm shown in FIGURES 8 and 9, the arm and liquid discharge means are both comprised by the curved tube 50 which has along its length a series of orifices 51 for the spray liquid and closed at the end 52. Spray liquid is fed to the other end of the arm by way of a feed tube (not shown). In FIGURE 8 the dashed lines show the arm in a position in which it has been deflected from its extended position. The spray arm shown in FIGURES 8 and 9 has been found to be very suitable for use in the spraying of ground at the foot of blackcurrant bushes, instead of the arm shown in FIGURE 1 as the latter, though quite satisfactory for use with top fruit such as apples, has been found to be insufficiently sensitive for use with bushes.

What I claim is:

1. A spray attachment for spraying ground closely adjacent the trunks of trees comprising in combination a spray boom attachable at one end to a draft vehicle and mounted vertically pivotable at the attached end, the end opposite the pivotable end carrying an arm attached thereto which is pivotable from the spray boom, the free end of the pivotable arm carrying a tree trunk contacting element, the pivotal movement of said arm being restrained through a biasing means, said pivotable arm carrying a spray discharge element adjacent the free end thereof, a ground contacting support for facilitating movement of the spray boom in the direction of travel of the draft vehicle and attached to said spray boom to permit turning thereof relative to the draft vehicle, a liquid control valve, and conduits for providing a sprayable liquid to the control valve and to the discharge element for spraying the ground adjacent the trees.

2. A spray attachment according to claim 1, which has a valve operatively connected to the pivotable arm, whereby the flow of sprayable liquid from the spray discharge element is prevented whenever the pivotable arm is in its extended position.

3. A spray attachment according to claim 1, in which the pivotable arm comprises a tube having a series of orifices which constitute the spray discharge element for the sprayable liquid.

4. A spray attachment according to claim 1 wherein the tree trunk contacting element comprises a roller wheel rotatably mounted on the pivotable arm to provide deflection and movement thereof around the periphery of tree trunks.

5. A spray attachment according to claim 1 in which the ground support comprises a pivotally mounted caster wheel adapted to maintain the spray boom at a substantially constant height above the ground.

6. A spray attachment according to claim 4, in which the roller wheel is a bicycle wheel having a pneumatic tire.

References Cited in the file of this patent

UNITED STATES PATENTS

| | | |
|---|---|---|
| 440,247 | Cain | Nov. 11, 1890 |
| 648,414 | Kenison | May 1, 1900 |
| 2,995,307 | McMahon | Aug. 8, 1961 |